United States Patent
Horiuchi et al.

(10) Patent No.: US 11,239,711 B2
(45) Date of Patent: Feb. 1, 2022

(54) ARMATURE MOLDED STRUCTURE

(71) Applicant: SANYO DENKI CO., LTD., Tokyo (JP)

(72) Inventors: Manabu Horiuchi, Tokyo (JP); Hiroki Sagara, Tokyo (JP); Jun Kitajima, Tokyo (JP); Mai Shimizu, Tokyo (JP); Takashi Matsushita, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 159 days.

(21) Appl. No.: 16/692,475

(22) Filed: Nov. 22, 2019

(65) Prior Publication Data

US 2020/0169140 A1 May 28, 2020

(30) Foreign Application Priority Data

Nov. 26, 2018 (JP) .............................. JP2018-220152

(51) Int. Cl.
*H02K 1/18* (2006.01)
*H02K 15/02* (2006.01)
(Continued)

(52) U.S. Cl.
CPC ............. *H02K 1/18* (2013.01); *H02K 1/146* (2013.01); *H02K 1/148* (2013.01); *H02K 3/522* (2013.01);
(Continued)

(58) Field of Classification Search
CPC .......... H02K 3/522; H02K 5/08; H02K 1/148; H02K 15/024; H02K 1/185; H02K 1/146;
(Continued)

(56) References Cited

U.S. PATENT DOCUMENTS

| 9,698,634 B2 | 7/2017 | Miyashita et al. |
| 2007/0063610 A1* | 3/2007 | Miyashita .............. H02K 1/148 310/216.057 |

(Continued)

FOREIGN PATENT DOCUMENTS

| JP | 2002-10539 A | 1/2002 |
| JP | 2016-135022 | 7/2016 |

OTHER PUBLICATIONS

Extended European Search Report (EESR) dated Mar. 27, 2020 for the corresponding European Patent Application No. 19211491.6.

*Primary Examiner* — Quyen P Leung
*Assistant Examiner* — Alexander A Singh
(74) *Attorney, Agent, or Firm* — Rankin, Hill & Clark LLP (57) ABSTRACT

An armature molded structure includes a cylindrical iron core used for a molded structure of a motor armature; a winding; and molding resin, wherein the iron core includes first core sheets and second core sheets, the first core sheet includes first magnetic poles placed along a circumferential direction of the iron core, tip portions, on an inner peripheral side of the iron core, of adjacent first magnetic poles form a coupling portion coupling the adjacent first magnetic poles, the second core sheet includes second magnetic poles placed along the circumferential direction of the iron core, tip portions, on the inner peripheral side of the iron core, of adjacent second magnetic poles form a non-coupling portion separating the adjacent second magnetic poles, the first and second core sheets are laminated along a central axis direction of the iron core in such a manner that the coupling portions coincide with each other, the non-coupling portions coincide with each other, the coupling portion and the non-coupling portion coincide with each other, the winding is wound around the first and second magnetic poles of the laminated first and second core sheets, the first and second (Continued)

core sheets and the winding are molded with the molding resin, the non-coupling portion delimits an opening window portion in an inner peripheral surface of the iron core, and the opening window portion is filled with the molding resin.

2 Claims, 6 Drawing Sheets

(51) Int. Cl.
  *H02K 5/08* (2006.01)
  *H02K 3/52* (2006.01)
  *H02K 1/14* (2006.01)
(52) U.S. Cl.
  CPC ............... *H02K 5/08* (2013.01); *H02K 15/02* (2013.01); *H02K 15/024* (2013.01); *H02K 1/185* (2013.01)
(58) Field of Classification Search
  CPC .......... H02K 15/02; H02K 1/18; H02K 29/03; H02K 21/022; H02K 1/141; H02K 2213/03
  USPC .... 310/216.016, 216.015, 216.004, 216.057, 310/216.059, 216.064, 216.074, 216.091, 310/216.092, 216.093, 216.094
  See application file for complete search history.

(56) References Cited

U.S. PATENT DOCUMENTS

| | | | |
|---|---|---|---|
| 2012/0256513 A1* | 10/2012 | Kessler | H02K 1/148 310/216.016 |
| 2015/0229166 A1* | 8/2015 | Miyashita | H02K 1/148 310/216.016 |
| 2016/0211717 A1 | 7/2016 | Honda et al. | |
| 2018/0109154 A1 | 4/2018 | Tsuiki et al. | |
| 2018/0152071 A1 | 5/2018 | Masugi et al. | |
| 2018/0226846 A1 | 8/2018 | Tsuiki et al. | |
| 2019/0013706 A1* | 1/2019 | Suzuki | H02K 1/18 |

* cited by examiner

ARMATURE MOLDED STRUCTURE

CROSS-REFERENCE TO RELATED APPLICATION

This application is based on Japanese Patent Application No. 2018-220152 filed with the Japan Patent Office on Nov. 26, 2018, the entire content of which is hereby incorporated by reference.

BACKGROUND

1. Technical Field

The present disclosure relates to an armature molded structure of a motor.

2. Related Art

A technology for forming an armature molded structure by resin molding is known. For example, according to JP-A-2016-135022, resin is poured into a magnetic pole tip portion on an inner surface side of an iron core forming an armature.

SUMMARY

An armature molded structure according to the embodiment of the present disclosure includes a cylindrical iron core used for a molded structure of a motor armature; a winding; and molding resin, wherein the iron core includes first core sheets and second core sheets, the first core sheet includes first magnetic poles placed along a circumferential direction of the iron core, tip portions, on an inner peripheral side of the iron core, of adjacent first magnetic poles form a coupling portion coupling the adjacent first magnetic poles, the second core sheet includes second magnetic poles placed along the circumferential direction of the iron core, tip portions, on the inner peripheral side of the iron core, of adjacent second magnetic poles form a non-coupling portion separating the adjacent second magnetic poles, the first and second core sheets are laminated along a central axis direction of the iron core in such a manner that the coupling portions coincide with each other, the non-coupling portions coincide with each other, the coupling portion and the non-coupling portion coincide with each other, the winding is wound around the first and second magnetic poles of the laminated first and second core sheets, the first and second core sheets and the winding are molded with the molding resin, the non-coupling portion delimits an opening window portion in an inner peripheral surface of the iron core, and the opening window portion is filled with the molding resin.

BRIEF DESCRIPTION OF DRAWINGS

FIGS. 1A and 1B illustrate examples of core sheets forming an iron core used for a molded structure of a motor armature according to one embodiment of the present disclosure.

FIGS. 7A to 7C are partial radial cross-sectional views of the armature molded structure according to the embodiment.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Preferably, the distance of an air gap between an armature and rotor of a motor is ensured in such a manner as to be constant from an inner periphery of an armature core. However, resin is poured into a magnetic pole tip portion. Hence, it is necessary to ensure a constant distance from an inscribed circle, as a result, it leads to a problem reducing torque.

An object of the present disclosure is to improve the filling property of resin while ensuring a constant distance from an inscribed circle in an armature molded structure. Consequently, the ensuring of strength is promoted. In addition, a reduction in torque is also prevented.

According to a view of the present disclosure, an armature molded structure is provided, the armature molded structure including a cylindrical iron core used for a molded structure of a motor armature a winding; and molding resin, wherein the iron core includes first core sheets and second core sheets, the first core sheet includes first magnetic poles placed along a circumferential direction of the iron core, tip portions, on an inner peripheral side of the iron core, of adjacent first magnetic poles form a coupling portion coupling the adjacent first magnetic poles, the second core sheet includes second magnetic poles placed along the circumferential direction of the iron core, tip portions, on the inner peripheral side of the iron core, of adjacent second magnetic poles form a non-coupling portion separating the adjacent second magnetic poles, the first and second core sheets are laminated along a central axis direction of the iron core in such a manner that the coupling portions coincide with each other, the non-coupling portions coincide with each other, the coupling portion and the non-coupling portion coincide with each other, the winding is wound around the first and second magnetic poles of the laminated first and second core sheets, the first and second core sheets and the winding are molded with the molding resin, the non-coupling portion delimits an opening window portion in an inner peripheral surface of the iron core, and the opening window portion is filled with the molding resin.

Each end of the iron core may be provided with a ring-shaped resin molded end portion, an uneven surface structure is formed on an inner peripheral surface of the resin molded end portion, and a recess of the uneven surface structure forms a flow path for pouring resin into the opening window portion.

The uneven surface structure may be intermittently provided in a circumferential direction on the inner peripheral surface of the resin molded end portion.

According to the present disclosure, it is possible to promote the ensuring of strength and also prevent a reduction in torque in the armature molded structure.

A molded structure of a motor armature according to one embodiment of the present disclosure is described in detail hereinafter with reference to the drawings.

Figure 1A:
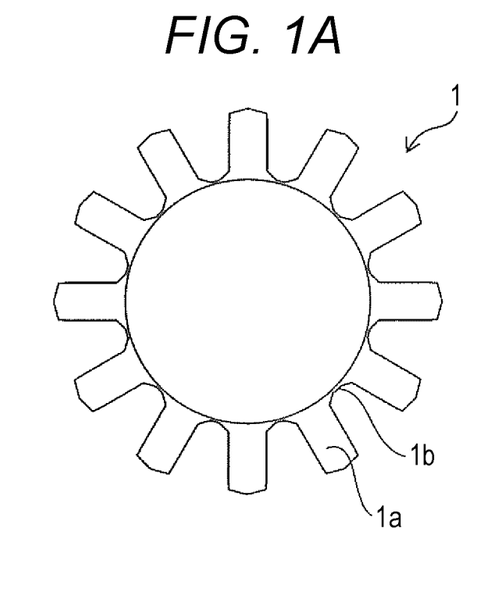
FIG. 1A is a plan view illustrating an example of the configuration of a first core sheet.
Figure 1B:
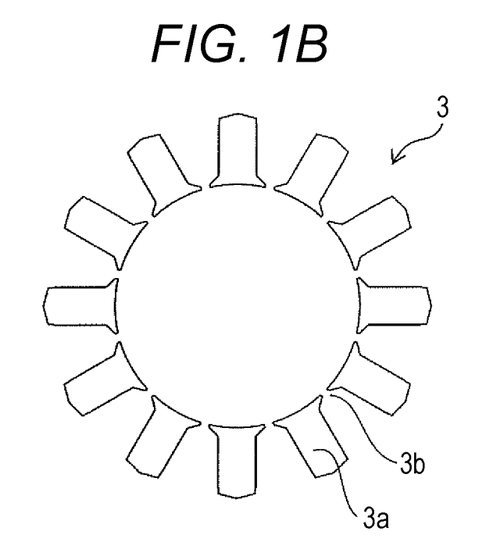
FIG. 1B is a plan view illustrating an example of the configuration of a second core sheet.
Figure 2:
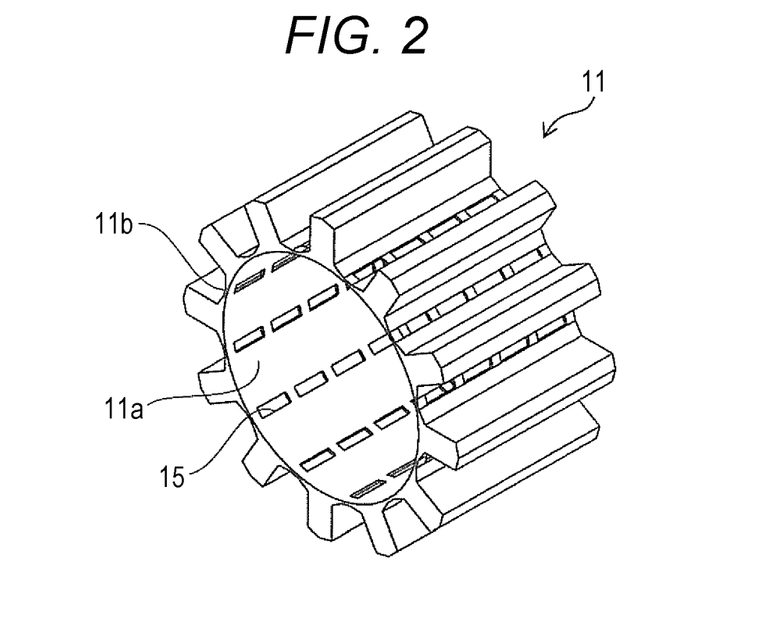
FIG. 2 is a perspective view illustrating an example of the configuration of the iron core including the laminated core sheets.

FIGS. 1A and 1B illustrate examples of core sheets forming an iron core used for a molded structure of a motor armature (stator) according to one embodiment of the present disclosure. FIG. 1A is a plan view illustrating an example of the configuration of a first core sheet. FIG. 1B is a plan view illustrating an example of the configuration of a second core sheet. FIG. 2 is a perspective view illustrating an example of the configuration of the iron core including the laminated core sheets. The armature of a motor is, for example, cylindrical. A rotor (mover) that rotates is placed on an inner peripheral side of the armature.

As illustrated in FIG. 1A, a first core sheet 1 includes magnetic poles 1a adjacent along a circumferential direction of a rotation axis of the first core sheet 1. Tip portions of adjacent magnetic poles 1a on an inner peripheral side are coupled to each other to form a coupling portion 1b. End portions on the inner peripheral side, including the coupling portions 1b, of the magnetic poles 1a delimit a cylindrical inner end portion.

As illustrated in FIG. 1B, a second core sheet 3 includes magnetic poles 3a adjacent along a circumferential direction of a rotation axis of the second core sheet 3. Tip portions of adjacent magnetic poles 3a on an inner peripheral side are separated from each other to form a non-coupling portion (opening portion) 3b.

The first core sheet 1 and the second core sheet 3 are aligned in such a manner that the position of the coupling portion 1b of the first core sheet 1 coincides to position of the non-coupling portion 3b of the second core sheet 3. In this manner, the first core sheets 1 and the second core sheets 3 are laminated along a central axis direction of the iron core. Accordingly, an iron core 11 such as the one illustrated in FIG. 2 can be formed. In other words, the iron core 11 is formed into a cylindrical shape having a hollow portion inside by the lamination of the first core sheets 1 and the second core sheets 3.

In the step of laminating the first core sheets 1 and the second core sheets 3, a step including performing alignment and lamination for one of the core sheets in a predetermined proportion and performing alignment and lamination for the other core sheet in a predetermined proportion is repeated. Consequently, the laminated second core sheets 3 include opening window portions 15 delimited by the continuous lamination of the aligned non-coupling portions (opening portions) 3b as illustrated in FIG. 2. More specifically, the opening window portion 15 is a portion including a through-hole formed into a window shape penetrating an inner peripheral surface 11a and an outer peripheral surface 11b.

Figure 3:
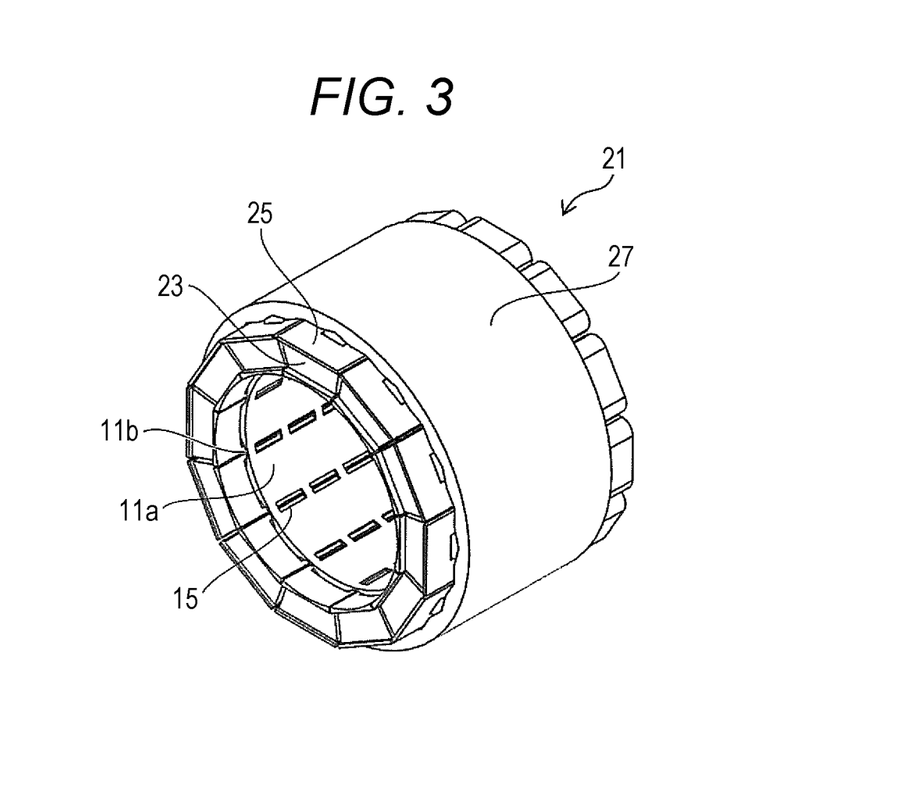
FIG. 3 is a perspective view illustrating a state where windings have been assembled to the iron core illustrated in FIG. 2.
Figure 4:
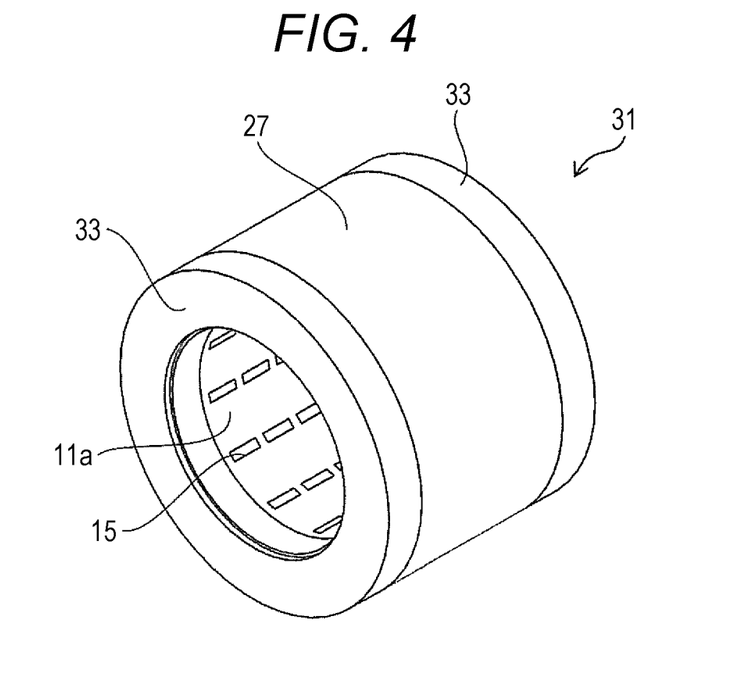
FIG. 4 is a perspective view illustrating an example of the structure after molding following the formation of the structure (laminated core) of FIG. 3.

FIG. 3 is a perspective view illustrating a state where windings 23 have been assembled to the iron core 11 illustrated in FIG. 2. FIG. 4 is a perspective view illustrating an example of the structure after molding following the formation of the structure (laminated core) of FIG. 3.

As illustrated in FIG. 3, a bobbin 25 including the winding 23 wound around the magnetic pole 1a is inserted into the laminated core sheets. A yoke 27 is then fitted to the outer peripheral side. As illustrated in FIG. 4, the structure illustrated, in FIG. 3 is then integrally molded by a molded resin 33.

Figure 5:
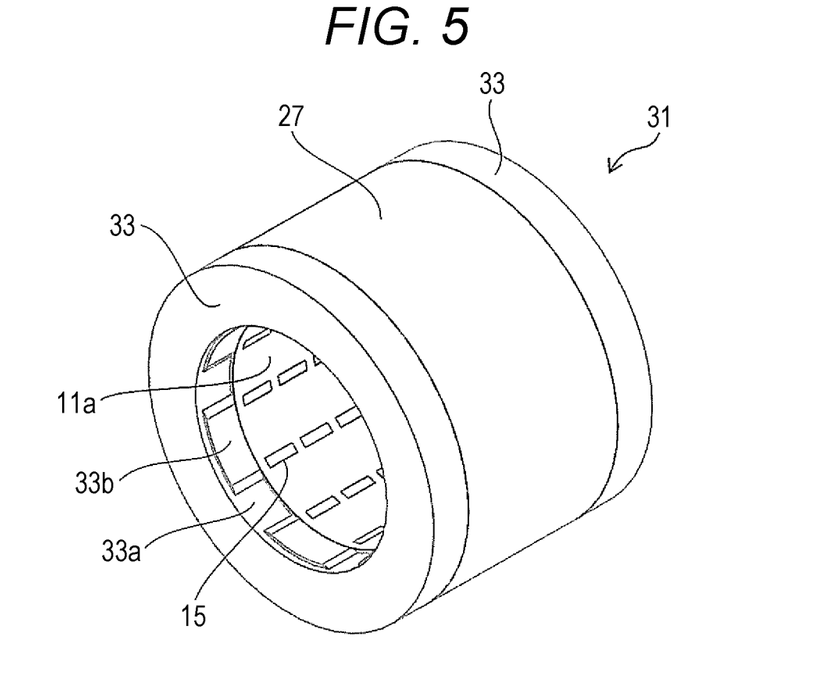
FIG. 5 is a perspective view illustrating an example of the structure after molding as in FIG. 4.

FIG. 5 is a perspective view illustrating an example of the structure after molding as in FIG. 4. The molded resin 33 is used for insert molding for the armature core. At this point in time, it is necessary to in some way determine a relative position of the laminated core being an insert with respect to the molded resin 33. Hence, as illustrated in FIG. 5, protruding portions 33b are intermittently formed in the circumferential direction on an inner peripheral surface 33a side of the molded resin (end portion) 33. Consequently, an uneven surface shape that is continuous in the circumferential direction can be provided on the inner peripheral surface 33a. In this manner, the uneven surface shape is intermittently provided in the circumferential direction to expose an end portion of the inner peripheral surface 11a of the iron core 11 in the recessed portions. Here, the end portion of the inner peripheral surface 11a of the iron core 11 is butted against the inside of a mold used for molding. Accordingly, the relative position for molding is ensured. Consequently, molding becomes easy.

Figure 6:
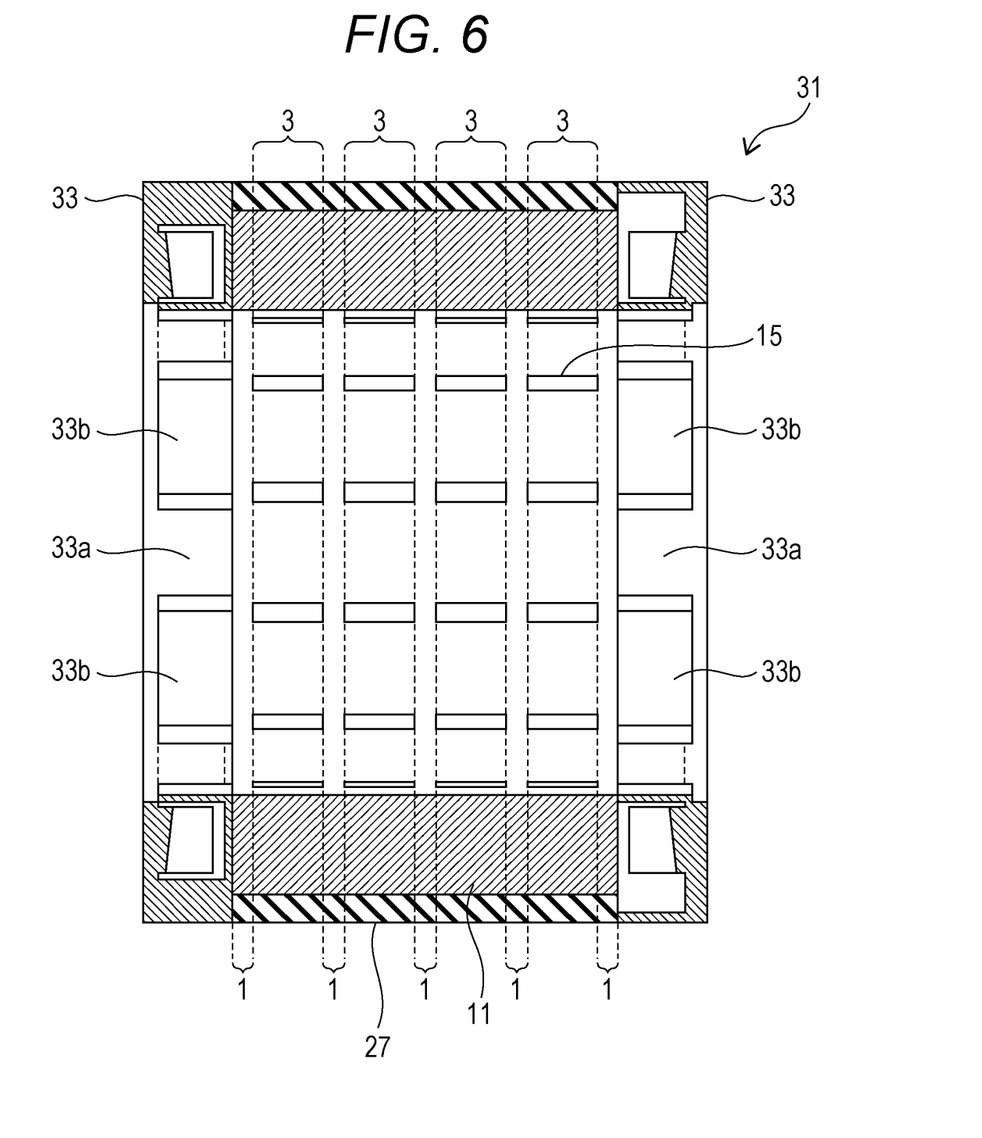
FIG. 6 is a cross-sectional view illustrating an example of the configuration of the armature molded structure according to the embodiment after molding, and illustrates an axial cross-section.

FIG. 6 is a cross-sectional view illustrating an example of the configuration of the armature molded structure after molding according to the embodiment. FIG. 6 illustrates a cross-section in an axial direction. The first core sheets 1 and the second core sheets 3 are laminated in the manner as described above to form the iron core 11 of the motor. At this point in time, only a predetermined number of either the first core sheets 1 or the second core sheets 3 is continuously laminated. Hence, portions 1 including the continuously laminated first core sheets 1 and portions 3 including the continuously laminated second core sheets 3 are formed on the inner peripheral surface 11a of the iron core 11. As described above, the opening window portions 15 as the through-holes penetrating the inner peripheral surface 11a through to the outer peripheral surface 11b are formed in the portion 3.

As illustrated in FIG. 3, after the windings of the motor are assembled, the molded resin 33 is used to obtain an integral molded member, such as the one illustrated in FIG. 5, by resin molding from a coil end portion to a coil internal portion. At this point in time, as illustrated in FIG. 2, the first core sheets 1 are laminated at a first end portion of end portions of the laminated core sheets included in the iron core 11 in a central axis direction thereof. Moreover, the first core sheets 1 are continuously laminated likewise, for example, at regular intervals from the first end portion. The same shall apply at a second end portion. Therefor-, the coupled coupling portions 1b of the core sheets inhibit the flow of molding resin in the axial direction. As a result, it is difficult for the resin to flow to the opening window portions 15 illustrated in FIG. 6. Hence, perfect sealing may not be possible.

Hence, the protruding portions (projections) 33b illustrated in FIG. 6 are provided at the end portion on the inner diameter to fill the resin also in the opening window portions 15. The resin at the winding end portion attempts to flow to the end surface of the iron core 11 from between the protruding portions 33b.

Figure 7A:
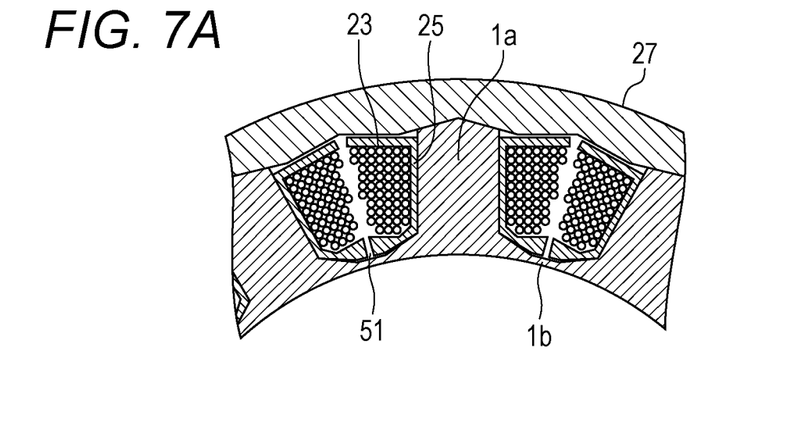
Figure 7B:
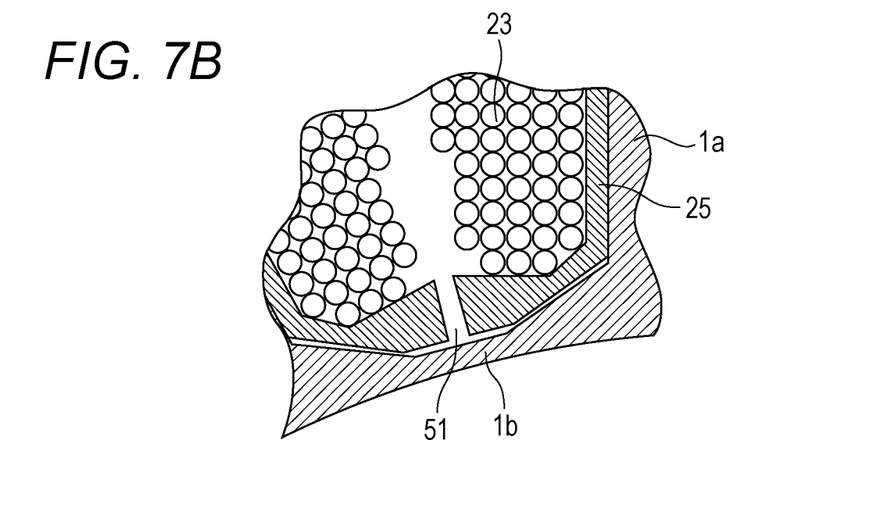
FIG. 7B illustrates an enlarged gap illustrated in FIG. 7A.
Figure 7C:
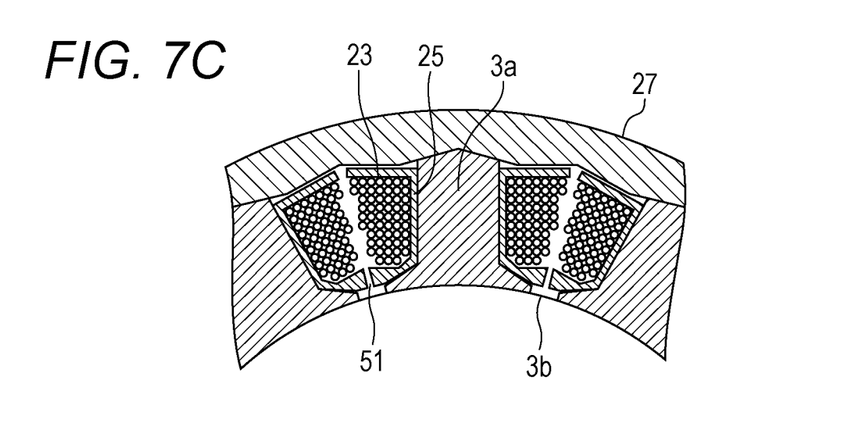
FIG. 7C is a partial radial cross-sectional view of the laminated second core sheets.

FIGS. 7A to 7C are partial radial cross-sectional views of the armature molded structure according to the embodiment. FIG. 7B illustrates an enlarged gap illustrated in FIG. 7A. FIG. 7C is a partial radial cross-sectional view of the laminated second core sheets. As illustrated in FIGS. 7A to 7C, the molding resin flows from the protruding portions (projections) 33b (refer to FIG. 6) to the opening window portions 15 illustrated in FIG. 6 through gaps 51 formed between the magnetic poles 1a and the coupling portions 1b, and the windings 23 and the bobbins 25. Therefore, it is easy to fill the opening window portions 15 with the resin. The opening window portions 15 are filled with the resin to enable an increase in the strength of the armature molded structure.

Figure 8:
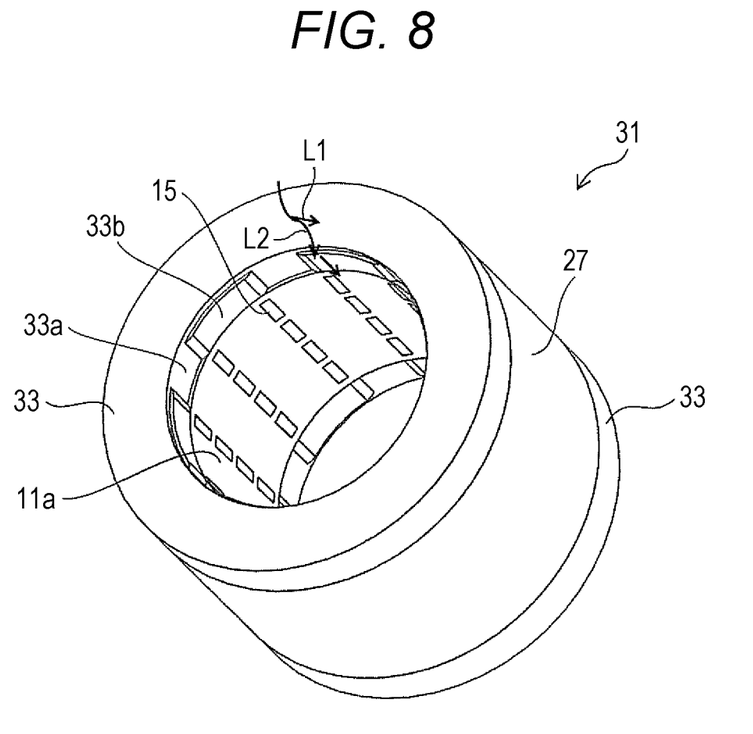
FIG. 8 is a perspective view for illustrating by example a resin flow path in the embodiment.

FIG. 8 is a perspective view for illustrating by example a resin flow path in the embodiment. As indicated by an arrow in FIG. 8, the molding resin is injected from the end surface of the armature core 31 in the axial direction. The molding resin flows toward the laminated core direction as indicated by a passage L1. Furthermore, as described above, part of the resin also flows toward a direction (L2) of the protruding portion (projection) 33b as indicated by a passage L2. As illustrated in FIG. 2, the end portion of a laminated core 21 includes the laminated first core sheets 1. Hence, the molding resin does not reach up to the opening window portion 15 on the inner periphery. However, the resin that has flown around the protruding portion (projection) 33b along the recess (inner peripheral surface) 33a can reach up to the opening window portion 15 through the gap 51 illustrated in the cross-sectional views of FIGS. 7A to 7C.

Therefore, the opening window portion 15 can be filled with the resin.

As described above, the first core sheets 1 having the coupling portions 1b and the second core sheets 3 having the non-coupling portions 3b are laminated in combination. At this point in time, a predetermined proportion of the core sheets continuously laminated includes only the first core sheets 1 or the second core sheets 3. Consequently, the torque of the motor can be increased. Moreover, cogging torque can also be reduced. In addition, a resin passage such as the one described above is formed; accordingly, the problem that the opening window portions 15 cause a reduction in the rigidity of the core can be solved.

In other words, according to the armature molded structure of the embodiment, in the armature structure of the motor, the first core sheets, and the second core sheets of at least one or more types are laminated in combination. Here, the coupling portion formed by the tip portions of the magnetic poles included in the first core sheet couples adjacent magnetic poles like a bridge. On the other hand, the second core sheet includes the non-coupling portions (opening portions). Here, the second core sheets may include two or more types of core sheets having the non-coupling portions. The opening window portions are formed by the laminated second core sheets having the non-coupling portions (opening portions) on the inner periphery of the laminated core of the motor obtained through resin molding after the winding work. Furthermore, the flow path for pouring resin into the opening window portions is provided on the end surface of the laminated core. Such a molded structure allows filling molding resin fully also in the opening window portions. Therefore, an increase in the strength of the molded structure can be promoted.

The embodiment is not limited by the illustrated configuration and the like. The above embodiment can be modified as appropriate within the scope that exerts the effect of the present disclosure. In addition, the above embodiment can be modified as appropriate and carried out as long as the modified embodiment does not depart from the scope of the object of the present disclosure.

Moreover, each constituent element described in the above embodiment can be selected as appropriate. An embodiment having a configuration including the selected element is also included in the embodiment.

The present disclosure can be used for an armature molded structure.

The armature molded structure according to the embodiment of the present disclosure may be the following first to third armature molded structures:

The above first armature molded structure is an armature structure of a motor obtained by, in core sheets laminated to form a cylindrical iron core used for a molded structure of a motor armature molding with resin the laminated core forming the iron core by laminating first core sheets having coupling portions that couple tip portions, on an inner peripheral side of the cylinder, of adjacent magnetic poles along a circumferential direction of the cylinder and second core sheets having non-coupling portions that do not couple tip portions of adjacent magnetic poles on an inner peripheral side in such a manner that the coupling portions coincide with the non-coupling portions, and a winding wound around the laminated core, the armature structure including opening window portions formed by the non-coupling portions in an inner peripheral surface of the laminated core, the opening window portions being obtained by continuously laminating a plurality of the second core sheets in a lamination direction, in which the resin is filled in the opening window portions.

The second armature molded structure is the first armature molded structure in which both ends of the laminated core molded structure in the lamination direction are provided respectively with ring-shaped resin molded end portions formed by the lamination of the first core sheets, an uneven surface structure is formed on an inner peripheral surface of the resin molded end portion, and a flow path for pouring the resin into the opening window portions is formed by recesses of the uneven surface structure.

The third armature molded structure is the second armature molded structure in which the uneven surface structure is intermittently provided in the circumferential direction on the inner peripheral surface of the resin molded end portion.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. An armature molded structure comprising:
a cylindrical iron core used for a molded structure of a motor armature;

a winding; and molding resin, wherein the cylindrical iron core includes first core sheets and second core sheets, the first core sheet includes first magnetic poles placed along a circumferential direction of the cylindrical iron core, tip portions, on an inner peripheral side of the cylindrical iron core, of adjacent first magnetic poles form a coupling portion coupling the adjacent first magnetic poles, the second core sheet includes second magnetic poles placed along the circumferential direction of the cylindrical iron core, tip portions, on the inner peripheral side of the cylindrical iron core, of adjacent second magnetic poles form a non-coupling portion separating the adjacent second magnetic poles, the first and second core sheets are laminated along a central axis direction of the cylindrical iron core in such a manner that the coupling portions coincide with each other, the non-coupling portions coincide with each other, the coupling portion and the non-coupling portion coincide with each other, the winding is wound around the first and second magnetic poles of the laminated first and second core sheets, the first and second core sheets and the winding are molded with the molding resin, the non-coupling portion delimits an opening window portion in an inner peripheral surface of the cylindrical iron core, the opening window portion is filled with the molding resin, each end of the cylindrical iron core is provided with a ring-shaped resin molded end portion, an uneven surface structure is formed on an inner peripheral surface of the resin molded end portion, and a recess of the uneven surface structure forms a flow path for pouring resin into the opening window portion.

2. The armature molded structure according to claim 1, wherein the uneven surface structure is intermittently provided in a circumferential direction on the inner peripheral surface of the resin molded end portion.

* * * * *